US009874975B2

(12) United States Patent
Benbasat et al.

(10) Patent No.: US 9,874,975 B2
(45) Date of Patent: *Jan. 23, 2018

(54) RECONSTRUCTION OF ORIGINAL TOUCH IMAGE FROM DIFFERENTIAL TOUCH IMAGE

(71) Applicant: Apple Inc., Cupertino, CA (US)

(72) Inventors: Ari Y. Benbasat, San Francisco, CA (US); William Matthew Vieta, Santa Clara, CA (US); Wayne Carl Westerman, Burlingame, CA (US); Steven P. Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,706

(22) Filed: May 2, 2016

(65) Prior Publication Data

US 2016/0357344 A1  Dec. 8, 2016

Related U.S. Application Data

(63) Continuation of application No. 13/448,182, filed on Apr. 16, 2012, now Pat. No. 9,329,723.

(51) Int. Cl.
*G06F 3/041* (2006.01)
(52) U.S. Cl.
CPC .................. *G06F 3/0418* (2013.01)
(58) Field of Classification Search
None
See application file for complete search history.

(56) References Cited

U.S. PATENT DOCUMENTS

| 4,087,625 A | 5/1978 | Dym et al. |
| 4,090,092 A | 5/1978 | Serrano |
| 4,304,976 A | 12/1981 | Gottbreht et al. |
| 4,475,235 A | 10/1984 | Graham |

(Continued)

FOREIGN PATENT DOCUMENTS

| CN | 1246638 A | 3/2000 |
| CN | 1527274 A | 9/2004 |

(Continued)

OTHER PUBLICATIONS

Non-Final Office Action dated Dec. 16, 2016, for U.S. Appl. No. 14/645,120, filed Mar. 11, 2015, ten pages.

(Continued)

*Primary Examiner* — Christopher Kohlman
(74) *Attorney, Agent, or Firm* — Morrison & Foerster, LLP

(57) ABSTRACT

Reconstruction of an original touch image from a differential touch image is disclosed. Reconstruction can include aligning columns of the differential touch image relative to each other and aligning the image to a baseline DC value. The column and baseline alignment can be based on the differential image data indicative of no touch or hover, because such data can more clearly show the amount of alignment needed to reconstruct the original image. The reconstruction can be performed using the differential image data alone. The reconstruction can also be performed using the differential image data and common mode data indicative of the missing image column average.

20 Claims, 13 Drawing Sheets

(56) References Cited

U.S. PATENT DOCUMENTS

| | | |
|---|---|---|
| 4,550,221 A | 10/1985 | Mabusth |
| 4,659,874 A | 4/1987 | Landmeier |
| 5,194,862 A | 3/1993 | Edwards |
| 5,317,919 A | 6/1994 | Awtrey |
| 5,483,261 A | 1/1996 | Yasutake |
| 5,488,204 A | 1/1996 | Mead et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 5,914,465 A | 6/1999 | Allen et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,452,514 B1 | 9/2002 | Philipp |
| 6,456,952 B1 | 9/2002 | Nathan |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,412,586 B1 | 8/2008 | Rajopadhye et al. |
| 7,504,833 B1 | 3/2009 | Seguine |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,719,523 B2 | 5/2010 | Hillis |
| 7,701,539 B2 | 8/2010 | Shih et al. |
| 7,907,126 B2 | 3/2011 | Yoon et al. |
| 7,932,898 B2 | 4/2011 | Philipp et al. |
| 8,026,904 B2 | 9/2011 | Westerman |
| 8,040,321 B2 | 10/2011 | Peng et al. |
| 8,040,326 B2 | 10/2011 | Hotelling et al. |
| 8,045,783 B2 | 10/2011 | Lee et al. |
| 8,068,097 B2 | 11/2011 | GuangHai |
| 8,120,371 B2 | 2/2012 | Day et al. |
| 8,125,312 B2 | 2/2012 | Orr |
| 8,169,421 B2 | 5/2012 | Wright et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,339,286 B2 | 12/2012 | Cordeiro |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,542,208 B2 | 9/2013 | Krah et al. |
| 8,593,410 B2 | 11/2013 | Hong et al. |
| 8,593,425 B2 | 11/2013 | Hong et al. |
| 8,614,688 B2 | 12/2013 | Chang |
| 8,680,877 B2 | 3/2014 | Lee et al. |
| 8,760,412 B2 | 6/2014 | Hotelling et al. |
| 8,773,146 B1 | 7/2014 | Hills et al. |
| 8,810,543 B1 | 8/2014 | Kurikawa |
| 8,902,172 B2 | 12/2014 | Peng et al. |
| 8,922,521 B2 | 12/2014 | Hotelling et al. |
| 8,957,874 B2 | 2/2015 | Elias |
| 8,982,096 B2 | 3/2015 | Hong et al. |
| 9,001,082 B1 | 4/2015 | Rosenberg et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,261,997 B2 | 2/2016 | Chang et al. |
| 9,280,251 B2 | 3/2016 | Shih |
| 9,329,723 B2 | 5/2016 | Benbasat et al. |
| 9,372,576 B2 | 6/2016 | Westerman |
| 9,582,131 B2 | 2/2017 | Elias |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0188151 A1 | 9/2004 | Gerpheide et al. |
| 2004/0239650 A1 | 12/2004 | Mackey |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0202969 A1 | 9/2006 | Hauck |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279395 A1 | 12/2007 | Philipp |
| 2007/0283832 A1 | 12/2007 | Hotelling |
| 2007/0285365 A1 | 12/2007 | Lee |
| 2008/0006454 A1 | 1/2008 | Hotelling |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0136787 A1 | 6/2008 | Yeh et al. |
| 2008/0136792 A1 | 6/2008 | Peng et al. |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0188267 A1 | 8/2008 | Sagong |
| 2008/0224962 A1 | 9/2008 | Kasai et al. |
| 2008/0238871 A1 | 10/2008 | Tam |
| 2008/0264699 A1 | 10/2008 | Chang et al. |
| 2008/0277259 A1 | 11/2008 | Chang |

(56) References Cited

U.S. PATENT DOCUMENTS

| | | |
|---|---|---|
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0020343 A1 | 1/2009 | Rothkopf et al. |
| 2009/0073138 A1 | 3/2009 | Lee et al. |
| 2009/0085894 A1 | 4/2009 | Gandhi et al. |
| 2009/0091551 A1 | 4/2009 | Hotelling et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0160787 A1 | 6/2009 | Westerman et al. |
| 2009/0174676 A1* | 7/2009 | Westerman ........... G06F 3/0418 345/173 |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey, IV et al. |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0102027 A1 | 4/2010 | Liu et al. |
| 2010/0110035 A1 | 5/2010 | Selker |
| 2010/0117985 A1 | 5/2010 | Wadia |
| 2010/0143848 A1 | 6/2010 | Jain et al. |
| 2010/0156846 A1 | 6/2010 | Long et al. |
| 2010/0194696 A1 | 8/2010 | Chang et al. |
| 2010/0194707 A1 | 8/2010 | Hotelling et al. |
| 2010/0245286 A1 | 9/2010 | Parker |
| 2010/0253638 A1 | 10/2010 | Yousefpor et al. |
| 2010/0328228 A1 | 12/2010 | Elias |
| 2010/0328248 A1 | 12/2010 | Mozdzyn |
| 2011/0007020 A1 | 1/2011 | Hong et al. |
| 2011/0025629 A1 | 2/2011 | Grivna et al. |
| 2011/0025635 A1 | 2/2011 | Lee |
| 2011/0096016 A1 | 4/2011 | Yilmaz |
| 2011/0134050 A1 | 6/2011 | Harley |
| 2011/0199105 A1 | 8/2011 | Otagaki et al. |
| 2011/0227874 A1 | 9/2011 | Faahraeus et al. |
| 2011/0231139 A1 | 9/2011 | Yokota |
| 2011/0241907 A1 | 10/2011 | Cordeiro |
| 2011/0248949 A1 | 10/2011 | Chang et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026099 A1 | 2/2012 | Harley |
| 2012/0044199 A1 | 2/2012 | Karpin et al. |
| 2012/0050216 A1 | 3/2012 | Kremin et al. |
| 2012/0056662 A1 | 3/2012 | Wilson et al. |
| 2012/0056851 A1 | 3/2012 | Chen et al. |
| 2012/0092288 A1 | 4/2012 | Wadia |
| 2012/0113047 A1 | 5/2012 | Hanauer et al. |
| 2012/0146726 A1 | 6/2012 | Huang |
| 2012/0146942 A1 | 6/2012 | Kamoshida et al. |
| 2012/0154324 A1 | 6/2012 | Wright et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0262395 A1 | 10/2012 | Chan |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0057511 A1 | 3/2013 | Shepelev et al. |
| 2013/0069911 A1 | 3/2013 | You |
| 2013/0076648 A1 | 3/2013 | Krah et al. |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0173211 A1 | 7/2013 | Hoch et al. |
| 2013/0176271 A1 | 7/2013 | Sobel et al. |
| 2013/0176273 A1 | 7/2013 | Li et al. |
| 2013/0215049 A1 | 8/2013 | Lee |
| 2013/0257785 A1 | 10/2013 | Brown et al. |
| 2013/0257797 A1 | 10/2013 | Wu et al. |
| 2013/0265276 A1 | 10/2013 | Obeidat et al. |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0307821 A1 | 11/2013 | Kogo |
| 2013/0321289 A1 | 12/2013 | Dubery et al. |
| 2013/0342479 A1 | 12/2013 | Pyo et al. |
| 2014/0002406 A1 | 1/2014 | Cormier et al. |
| 2014/0009438 A1 | 1/2014 | Liu et al. |
| 2014/0022201 A1 | 1/2014 | Boychuk |
| 2014/0043546 A1 | 2/2014 | Yamazaki et al. |
| 2014/0071084 A1 | 3/2014 | Sugiura |
| 2014/0078096 A1 | 3/2014 | Tan et al. |
| 2014/0104225 A1 | 4/2014 | Davidson et al. |
| 2014/0104228 A1 | 4/2014 | Chen et al. |
| 2014/0132560 A1 | 5/2014 | Huang et al. |
| 2014/0145997 A1 | 5/2014 | Tiruvuru |
| 2014/0168540 A1 | 6/2014 | Wang et al. |
| 2014/0240291 A1 | 8/2014 | Nam |
| 2014/0247245 A1 | 9/2014 | Lee |
| 2014/0267070 A1 | 9/2014 | Shahparnia et al. |
| 2014/0267146 A1 | 9/2014 | Chang et al. |
| 2014/0285469 A1 | 9/2014 | Wright et al. |
| 2014/0347574 A1 | 11/2014 | Tung et al. |
| 2014/0362034 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0042607 A1 | 2/2015 | Takanohashi |
| 2015/0049043 A1 | 2/2015 | Yousefpor |
| 2015/0049044 A1 | 2/2015 | Yousefpor |
| 2015/0077375 A1 | 3/2015 | Hotelling et al. |
| 2015/0103047 A1 | 4/2015 | Hanauer et al. |
| 2015/0123939 A1 | 5/2015 | Kim et al. |
| 2015/0227240 A1 | 8/2015 | Hong et al. |
| 2015/0242028 A1 | 8/2015 | Roberts et al. |
| 2015/0253907 A1 | 9/2015 | Elias |
| 2015/0309610 A1 | 10/2015 | Rabii et al. |
| 2015/0370387 A1 | 12/2015 | Yamaguchi et al. |
| 2015/0378465 A1 | 12/2015 | Shih et al. |
| 2016/0062533 A1 | 3/2016 | O'Connor |
| 2016/0154505 A1 | 6/2016 | Chang |
| 2016/0154529 A1 | 6/2016 | Westerman |
| 2016/0224177 A1 | 8/2016 | Krah |

(56) References Cited

U.S. PATENT DOCUMENTS

| | | |
|---|---|---|
| 2016/0224189 A1 | 8/2016 | Yousefpor et al. |
| 2016/0266676 A1 | 9/2016 | Wang et al. |
| 2016/0266679 A1 | 9/2016 | Shahparnia et al. |
| 2016/0283023 A1 | 9/2016 | Shin et al. |
| 2016/0357344 A1 | 12/2016 | Benbasat et al. |
| 2017/0090619 A1 | 3/2017 | Yousefpor |
| 2017/0139539 A1 | 5/2017 | Yao et al. |

FOREIGN PATENT DOCUMENTS

| | | |
|---|---|---|
| CN | 1672119 A | 9/2005 |
| CN | 1689677 A | 11/2005 |
| CN | 1711520 A | 12/2005 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101419516 A | 4/2009 |
| CN | 103294321 A | 9/2013 |
| CN | 103809810 A | 5/2014 |
| CN | 104020908 A | 9/2014 |
| DE | 11 2008 001 245 T5 | 3/2010 |
| EP | 0 853 230 A1 | 7/1998 |
| EP | 1 192 585 A1 | 4/2002 |
| EP | 1 192 585 B1 | 4/2002 |
| EP | 1 573 706 A2 | 2/2004 |
| EP | 1 573 706 A3 | 2/2004 |
| EP | 1 455 264 A2 | 9/2004 |
| EP | 1 455 264 A3 | 9/2004 |
| EP | 1 644 918 A2 | 12/2004 |
| EP | 1 717 677 A2 | 11/2006 |
| EP | 1 986 084 A1 | 10/2008 |
| EP | 2 077 489 A1 | 7/2009 |
| EP | 2 256 606 A2 | 12/2010 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2005-301373 A | 10/2005 |
| JP | 2007-018515 A | 1/2007 |
| JP | 2008-510251 A | 4/2008 |
| JP | 2008-225415 A | 9/2008 |
| KR | 10-20040091728 A | 10/2004 |
| KR | 10-20070002327 A | 1/2007 |
| KR | 10-2008-0019125 A | 3/2008 |
| KR | 10-2013-0094495 A | 8/2013 |
| KR | 10-2013-0117499 A | 10/2013 |
| KR | 10-2014-0074454 A | 6/2014 |
| TW | 200715015 A | 4/2007 |
| TW | 200826032 A | 6/2008 |
| TW | 2008-35294 A | 8/2008 |
| TW | M341273 U | 9/2008 |
| TW | M344522 | 11/2008 |
| TW | M344544 | 11/2008 |
| TW | 201115442 A1 | 5/2011 |
| TW | 201401129 A | 1/2014 |
| TW | 201419071 A | 5/2014 |
| WO | WO-99/35633 A2 | 7/1999 |
| WO | WO-01/097204 A1 | 12/2001 |
| WO | WO-2005/114369 A2 | 12/2005 |
| WO | WO-2005/114369 A3 | 12/2005 |
| WO | WO-2006/020305 A2 | 2/2006 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/066488 A1 | 6/2007 |
| WO | WO-2007/089766 A2 | 8/2007 |
| WO | WO-2007/115032 A2 | 10/2007 |
| WO | WO-2007/146785 A2 | 12/2007 |
| WO | WO-2007/146785 A3 | 12/2007 |
| WO | WO-2008/007118 A2 | 1/2008 |
| WO | WO-2008/007118 A3 | 1/2008 |
| WO | WO-2008/047990 A1 | 4/2008 |
| WO | WO-2008/076237 A2 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/088659 A1 | 8/2010 |
| WO | WO-2010/117882 A2 | 10/2010 |
| WO | WO-2011/137200 A1 | 11/2011 |
| WO | WO-2013/158570 A1 | 10/2013 |
| WO | WO-2014/127716 A1 | 8/2014 |
| WO | WO-2015/017196 A1 | 2/2015 |
| WO | WO-2015/023410 A1 | 2/2015 |
| WO | WO-2015/072722 A1 | 5/2015 |
| WO | WO-2015/178920 A1 | 11/2015 |
| WO | WO-2016/048269 A1 | 3/2016 |
| WO | WO-2016/069642 A1 | 5/2016 |
| WO | WO-2016/126525 A1 | 8/2016 |
| WO | WO-2016/144437 A1 | 9/2016 |
| WO | WO-2017/058415 A2 | 4/2017 |

OTHER PUBLICATIONS

Non-Final Office Action dated Dec. 19, 2016, for U.S. Appl. No. 14/318,157, filed Jun. 27, 2014, eleven pages.

Final Office Action dated Nov. 4, 2016, for U.S. Appl. No. 14/082,003, filed Nov. 15, 2013, 18 pages.

Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.

Chinese Search Report completed Dec. 14, 2011, for CN Patent Application No. ZL201020108330X, filed Feb. 2, 2010, with English Translation, 22 pages.

Chinese Search Report completed May 18, 2015, for CN Patent Application No. 201310042816.6, filed Feb. 2, 2010, two pages.

European Search Report dated Jul. 21, 2010, for EP Patent Application 10151969.2, six pages.

European Search Report dated Apr. 25, 2012, for EP Patent Application No. 08022505.5, 12 pages.

European Search Report dated Dec. 3, 2012, for EP Patent Application No. 12162177.5, seven pages.

European Search Report dated Feb. 13, 2013, for EP Patent Application No. 12192450.0, six pages.

European Search Report dated Aug. 31, 2015, for EP Application No. 15166813.4, eight pages.

Final Office Action dated Jan. 5, 2012, for U.S. Appl. No. 12/206,680, filed Sep. 8, 2008, 15 pages.

Final Office Action dated Jan. 3, 2013, for U.S. Appl. No. 11/818,498, filed Jun. 13, 2007, 17 pages.

Final Office Action dated Feb. 1, 2013, for U.S. Appl. No. 12/642,466, filed Dec. 18, 2009, nine pages.

Final Office Action dated Feb. 5, 2013, for U.S. Appl. No. 12/500,911, filed Jul. 10, 2009, 15 pages.

Final Office Action dated Apr. 30, 2013, for U.S. Appl. No. 12/494,173, filed Jun. 29, 2009, 7 pages.

Final Office Action dated May 22, 2013, for U.S. Appl. No. 12/206,680, filed Sep. 8, 2008, 16 pages.

Final Office Action dated Jun. 21, 2013, for U.S. Appl. No. 12/545,754, filed Aug. 21, 2009, 6 pages.

Final Office Action dated Jul. 19, 2013, for U.S. Appl. No. 12/545,604, filed Aug. 21, 2009, 17 pages.

Final Office Action dated Aug. 12, 2013, for U.S. Appl. No. 12/238,333, filed Sep. 25, 2008, 19 pages.

(56) References Cited

OTHER PUBLICATIONS

Final Office Action dated Aug. 13, 2013, for U.S. Appl. No. 12/238,342, filed Sep. 25, 2008, 14 pages.
Final Office Action dated Jan. 27, 2014, for U.S. Appl. No. 12/206,680, filed Sep. 8, 2008, 20 pages.
Final Office Action dated Apr. 23, 2014 for U.S. Appl. No. 12/847,987, filed Jul. 30, 2010, 16 pages.
Final Office Action dated May 9, 2014, for U.S. Appl. No. 12/642,466, filed Dec. 18, 2009, 13 pages.
Final Office Action dated Jul. 16, 2014, for U.S. Appl. No. 12/545,604, filed Aug. 21, 2009, 18 pages.
Final Office Action dated Oct. 22, 2014, for U.S. Appl. No. 12/238,342, filed Sep. 25, 2008, 16 pages.
Final Office Action dated Oct. 22, 2014, for U.S. Appl. No. 13/448,182, filed Apr. 16, 2012, 11 pages.
Final Office Action dated Apr. 22, 2015, for U.S. Appl. No. 12/238,333, filed Sep. 25, 2008, 23 pages.
Final Office Action dated Jun. 11, 2015, for U.S. Appl. No. 13/448,182, filed Apr. 16, 2012, 12 pages.
Final Office Action dated Nov. 12, 2015, for U.S. Appl. No. 14/082,074, filed Nov. 15, 2013, 22 pages.
Final Office Action dated Jan. 4, 2016, for U.S. Appl. No. 14/082,003, filed Nov. 15, 2013, 25 pages.
Final Office Action dated Jan. 29, 2016, for U.S. Appl. No. 12/642,466, filed Dec. 18, 2009, nine pages.
Final Office Action dated Apr. 8, 2016, for U.S. Appl. No. 13/899,391, filed May 21, 2013, ten pages.
Final Office Action dated May 9, 2016, for U.S. Appl. No. 14/318,157, filed Jun. 27, 2014, ten pages.
Final Office Action dated May 27, 2016, for U.S. Appl. No. 14/645,120, filed Mar. 11, 2015, twelve pages.
Final Office Action dated Jun. 14, 2016, for U.S. Appl. No. 14/550,686, filed Nov. 21, 2014, ten pages.
International Search Report dated Mar. 10, 2010, for PCT Application No. PCT/US2010/22868, filed Feb. 2, 2010, three pages.
International Search Report dated Jan. 14, 2011, for PCT Application No. PCT/US2010/029698, filed Apr. 1, 2010, 4 pages.
International Search Report dated May 2, 2011, for PCT Application No. PCT/US2010/058988, filed Dec. 3, 2010, five pages.
International Search Report dated Aug. 6, 2013, for PCT Application No. PCT/US2013/036662, filed Apr. 15, 2013, three pages.
International Search Report dated Sep. 24, 2104, for PCT Application No. PCT/US/2014/39245, three pages.
International Search Report dated Dec. 12, 2014, for PCT Application No. PCT/US2014/56795, two pages.
International Search Report dated Jan. 29, 2015, for PCT Application No. PCT/US2014/047888, filed Jul. 23, 2014, six pages.
International Search Report dated Jan. 8, 2016, for PCT Application No. PCT/US2015/057644, filed Oct. 27, 2015, four pages.
International Search Report dated May 9, 2016, for PCT Application No. PCT/US2016/015479, filed Jan. 28, 2016, five pages.
International Search Report dated May 11, 2016, for PCT Application No. PCT/US2016/016011, filed Feb. 1, 2016, six pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Malik, S. et al. (2004). "Visual Touchpad: A Two-Handed Gestural Input Device," *Proceedings of the 6th International Conference on Multimodal Interfaces*, State College, PA, Oct. 13-15, 2004, *ICMI '04, ACM* pp. 289-296.
Non-Final Office Action dated Feb. 4, 2011, for U.S. Appl. No. 12/038,760, filed Feb. 27, 2008, 18 pages.
Non-Final Office Action dated Jun. 9, 2011, for U.S. Appl. No. 12/206,680, filed Sep. 8, 2008, 13 pages.
Non-Final Office Action dated Mar. 9, 2012, for U.S. Appl. No. 12/238,342, filed Sep. 25, 2008, 26 pgs.
Non-Final Office Action dated May 3, 2012, for U.S. Appl. No. 12/238,333, filed Sep. 25, 2008, 22 pgs.
Non-Final Office Action dated May 25, 2012, for U.S. Appl. No. 11/818,498, filed Jun. 13, 2007, 16 pages.
Non-Final Office Action dated Jun. 7, 2012, for U.S. Appl. No. 12/500,911, filed Jul. 10, 2009, 16 pages.
Non-Final Office Action dated Aug. 28, 2012, for U.S. Appl. No. 12/642,466, filed Dec. 18, 2009, nine pages.
Non-Final Office Action dated Sep. 26, 2012, for U.S. Appl. No. 12/206,680, filed Sep. 8, 2008, 14 pages.
Non-Final Office Action dated Oct. 5, 2012, for U.S. Appl. No. 12/545,754, filed Aug. 21, 2009, 10 pages.
Non-Final Office Action dated Nov. 23, 2012, for U.S. Appl. No. 12/545,557, filed Aug. 21, 2009, 11 pages.
Non-Final Office Action dated Nov. 28, 2012, for U.S. Appl. No. 12/494,173, filed Jun. 29, 2009, six pages.
Non-Final office Action dated Jan. 7, 2013, for U.S. Appl. No. 12/545,604, filed Aug. 21, 2009, 12 pages.
Non-Final Office Action dated Jan. 7, 2013, for U.S. Appl. No. 12/238,333, filed Sep. 25, 2008, 20 pgs.
Non-Final Office Action dated Feb. 15, 2013, for U.S. Appl. No. 12/238,342, filed Sep. 25, 2008, 15 pages.
Non-Final Office Action dated Mar. 29, 2013 for U.S. Appl. No. 13/737,779, filed Jan. 9, 2013, nine pages.
Non-Final Office Action dated Sep. 6, 2013, for U.S. Appl. No. 12/847,987, filed Jul. 30, 2010, 15 pages.
Non-Final Office Action dated Sep. 10, 2013, for U.S. Appl. No. 12/545,754, filed Aug. 21, 2009, six pages.
Non-Final Office Action dated Sep. 30, 2013, for U.S. Appl. No. 12/206,680, filed Sep. 8, 2008, 18 pages.
Non-Final Office Action dated Nov. 8, 2013, for U.S. Appl. No. 12/642,466, filed Dec. 18, 2009, 12 pages.
Non-Final Office Action dated Dec. 19, 2013, for U.S. Appl. No. 12/545,604, filed Aug. 21, 2009, 17 pages.
Non-Final Office Action dated Jan. 2, 2014, for U.S. Appl. No. 12/545,754, filed Aug. 21, 2009, 11 pages.
Non-Final Office Action dated Jan. 3, 2014 , for U.S. Appl. No. 12/545,557, filed Aug. 21, 2009, 9 pages.
Non-Final Office Action dated Jan. 31, 2014, for U.S. Appl. No. 13/448,182, filed Apr. 16, 2012, 18 pages.
Non-Final Office Action dated Mar. 12, 2014, for U.S. Appl. No. 12/238,342, filed Sep. 25, 2008, 15 pages.
Non-Final Office Action dated Apr. 10, 2014, for U.S. Appl. No. 14/055,717, filed Oct. 16, 2013, 10 pages.
Non-Final Office Action dated Sep. 18, 2014, for U.S. Appl. No. 12/238,333, filed Sep. 25, 2008, 21 pages.
Non-Final Office Action dated Apr. 10, 2015, for U.S. Appl. No. 14/082,074, filed Nov. 15, 2013, 23 pages.
Non-Final Office Action dated May 4, 2015, for U.S. Appl. No. 12/642,466, filed Dec. 18, 2009, nine pages.
Non-Final Office Action dated May 8, 2015, for U.S. Appl. No. 14/082,003, filed Nov. 15, 2013, 25 pages.
Non-Final Office Action dated Aug. 20, 2015 , for U.S. Appl. No. 14/550,686, filed Nov. 21, 2014, ten pages.
Non-Final Office Action dated Oct. 5, 2015, for U.S. Appl. No. 13/899,391, filed May 21, 2013, ten pages.
Non-Final Office Action dated Oct. 6, 2015, for U.S. Appl. No. 14/318,157, filed Jun. 27, 2014, seven pages.
Non-Final Office Action dated Oct. 27, 2015, for U.S. Appl. No. 14/645,120, filed Mar. 11, 2015, eight pages.
Non-Final Office Action dated Apr. 14, 2016, for U.S. Appl. No. 14/558,529, filed Dec. 2, 2014, twenty pages.
Non-Final Office Action dated May 25, 2016, for U.S. Appl. No. 14/082,003, filed Nov. 15, 2013, 23 pages.
Non-Final Office Action dated Jun. 1, 2016, for U.S. Appl. No. 14/615,186, filed Feb. 5, 2015, eight pages.
Notice of Allowance dated Jun. 10, 2013, for U.S. Appl. No. 12/545,557, filed Aug. 21, 2009, 9 pages.
Notice of Allowance dated Aug. 19, 2013, for U.S. Appl. No. 12/500,911, filed Jul. 10, 2009, six pages.
Notice of Allowance dated Sep. 3, 2013, for U.S. Appl. No. 13/737,779, filed Jan. 9, 2013, 10 pages.
Notice of Allowance dated Apr. 11, 2014, for U.S. Appl. No. 12/545,557, filed Aug. 21, 2009, 9 pages.
Notice of Allowance dated Aug. 21, 2014, for U.S. Appl. No. 12/545,754, filed Aug. 21, 2009, 8 pages.

(56) References Cited

OTHER PUBLICATIONS

Notice of Allowance dated Oct. 15, 2014, for U.S. Appl. No. 12/494,173, filed Jun. 29, 2009, eight pages.
Notice of Allowance dated Nov. 7, 2014, for U.S. Appl. No. 14/055,717, filed Oct. 16, 2013, six pages.
Notice of Allowance dated Mar. 16, 2015, for U.S. Appl. No. 14/312,489, filed Jun. 23, 2014, 8 pages.
Notice of Allowance dated Dec. 1, 2015, for U.S. Appl. No. 12/238,333, filed Sep. 25, 2008, nine pages.
Notice of Allowance dated Jan. 8, 2016, for U.S. Appl. No. 13/448,182, filed Apr. 16, 2012, nine pages.
Rekimoto, J. (2002). "SmartSkin: An Infrastructure for Freehand Manipulation on Interactive Surfaces," *CHI* 2002, Apr. 20-25, 2002. [(Apr. 20, 2002). 4(1):113-120.].
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Apr. 29, 2009, for NL Application No. 2001672, with English translation of Written Opinion, eight pages.
Search Report dated Oct. 14, 2015, for TW Application No. 103116003, one page.
Search Report dated Nov. 12, 2015, for ROC (Taiwan) Patent Application No. 103105965, with English translation, two pages.
TW Search Report dated May 3, 2016, for TW Application No. 104115152, one page.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Wilson, A.D. (Oct. 15, 2006). "Robust Computer Vision-Based Detection of Pinching for One and Two-Handed Gesture Input," *ACM, USIT '06*, Montreux, Switzerland, Oct. 15-18, 2006, pp. 255-258.
Yang, J-H. et al. (Jul. 2013). "A Noise-Immune High-Speed Readout Circuit for In-Cell Touch Screen Panels," *IEEE Transactions on Circuits and Systems—1: Regular Papers* 60(7):1800-1809.
Final Office Action dated Sep. 29, 2016, for U.S. Appl. No. 14/558,529, filed Dec. 2, 2014, 22 pages.
Non-Final Office Action dated Dec. 14, 2016, for U.S. Appl. No. 14/550,686, filed Nov. 21, 2014, eight pages.
Notice of Allowance dated Dec. 2, 2016, for U.S. Appl. No. 14/615,186, filed Feb. 5, 2015, seven pages.
European Search Report dated Jul. 27, 2017, for EP Application No. 14902458.0, four pages.
Final Office Action dated Jul. 26, 2017, for U.S. Appl. No. 14/318,157, filed Jun. 27, 2014, ten pages.
Final Office Action dated Aug. 10, 2017, for U.S. Appl. No. 14/645,120, filed Mar. 11, 2015, twelve pages.
Final Office Action dated Aug. 21, 2017, for U.S. Appl. No. 14/550,686, filed Nov. 21, 2014, 11 pages.
Non-Final Office Action dated Mar. 13, 2017, for U.S. Appl. No. 14/082,003, filed Nov. 15, 2013, 20 pages.
Non-Final Office Action dated Jun. 14, 2017, for U.S. Appl. No. 15/006,987, filed Jan. 26, 2016, 14 pages.
Non-Final Office Action dated Jun. 26, 2017, for U.S. Appl. No. 14/558,529, filed Dec. 2, 2014, six pages.

\* cited by examiner

RECONSTRUCTION OF ORIGINAL TOUCH IMAGE FROM DIFFERENTIAL TOUCH IMAGE

CROSS REFERENCE TO RELATED APPLICATIONS

This application is a continuation of U.S. patent application Ser. No. 13/448,182, filed Apr. 16, 2016 and published on Oct. 17, 2013 as U.S. Publication No. 2013-0271427, the contents of which are incorporated by reference herein in their entirety for all intended purposes.

FIELD

This relates generally to a differential touch image and more specifically to reconstructing an original touch image from a differential touch image.

BACKGROUND

FIG. 1 illustrates an exemplary touch image captured by a touch sensitive device, such as a touch panel. In the example of FIG. 1, touch image 100 can include rows 101 and columns 102 of image data (depicted by small circles), where the image data values can indicate an area 110 of the device at which an object touched or hovered over the panel (depicted by a broken circle), and the remaining untouched area 120.

Two types of touch images that can be captured include an original touch image and a differential touch image, depending on the scan configuration of the device. FIG. 2 illustrates an exemplary column 102 from the touch image 100 of FIG. 1 showing what the image data 225 can look like in an original touch image and what the image data 235 can look like in a differential touch image. For explanatory purposes, the image data is shown in FIG. 2 as continuous, although it should be understood that the image data can also be discrete as illustrated in FIG. 1. In the original touch image, the image data indicative of an untouched area 225a can have a value of zero and the image data indicative of a touched area 225b can have values greater than zero, depending on the proximity of the touching or hovering object. The original touch image can include actual magnitudes of the image values. In the differential touch image, each column of image data can be balanced to have an average value of zero, i.e., having the DC information removed. As such, the image data indicative of an untouched area 235a can have a negative value and the image data indicative of a touched area 235b can have negative and positive values depending on the proximity of the touching or hovering object. As such, the column's negative and positive values can balance out to zero. The differential touch image can include differential (or relative) magnitudes of the image values.

A touch sensitive device capable of generating a differential touch image can have some advantages. For example, some device hardware used to generate an original touch image can be eliminated, thereby freeing up space to expand the device's viewing area. Also, image effects, such as thermal drift, can have little or no effect on a differential image. However, because many touch sensitive devices require the actual image value magnitudes (such as provided by an original touch image) to perform various functions, a differential touch image can have limited use.

SUMMARY

This relates to reconstructing an original touch image from a differential touch image in a touch sensitive device. A reconstruction method can include aligning columns of the differential touch image relative to each other based on image data indicative of no touch or hover ("untouched data"). Untouched data can more clearly show how much column alignment is needed compared to image data indicative of a touch or hover ("touched data"). The method can further include aligning the image to a baseline value based on the untouched data in order to restore the previously removed DC information to the differential image. The untouched data can more clearly show how much baseline alignment is needed compared to the touched data. In one example, the reconstruction can be performed using the differential image data alone. In another example, the reconstruction can be performed using the differential image data and common mode data indicative of the missing image column average. The ability to use the differential touch image to reconstruct the original touch image can advantageously provide the benefits of the differential image while performing device functions with the reconstructed original image.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to reconstructing an original touch image from a differential touch image in a touch sensitive device. A reconstruction method can include aligning columns of the differential touch image relative to each other based on image data indicative of no touch or hover ("untouched data"). Untouched data can more clearly show how much column alignment is needed compared to image data indicative of a touch or hover ("touched data"). The method can further include aligning the image to a baseline value, representative of the previously removed DC information, based on the untouched data. The untouched data can more clearly show how much baseline alignment is needed compared to the touched data. In some embodiments, the reconstruction can be performed using the differential image data alone. In other embodiments, the reconstruction can be performed using the differential image data and common mode data (i.e., output from a touch device when there is no proximate object). The ability to use the differential touch image to reconstruct the original image can advantageously provide the benefits of the differential image while also performing device functions with the reconstructed original image.

In some embodiments, the differential touch image can be a fully differential touch image. Although reconstruction from offsets based on DC balancing is described herein, it should be understood that reconstruction based on any image offsets can be performed according to various embodiments.

Figure 3:
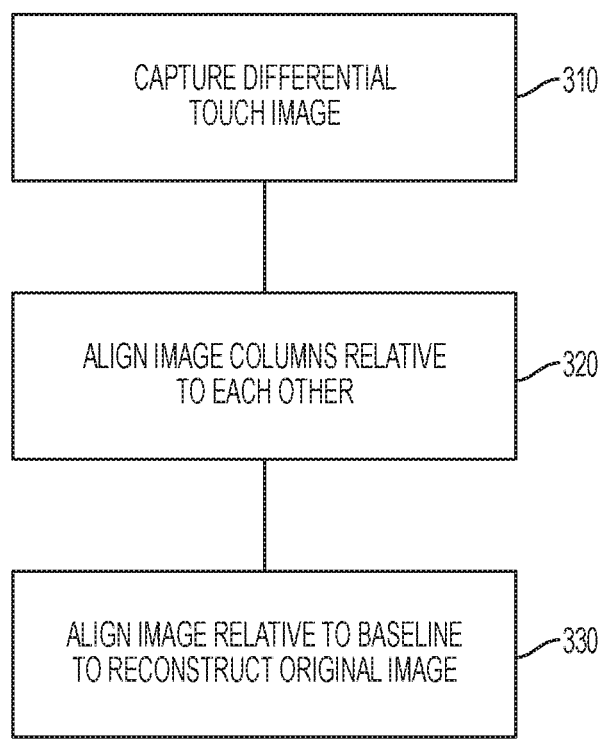
FIG. 3 illustrates an exemplary method for reconstructing an original touch image from a differential touch image according to various embodiments.

FIG. 3 illustrates an exemplary method for reconstructing an original touch image from a differential touch image. In the example of FIG. 3, a differential touch image can be captured during a differential scan of a touch panel (310). In some embodiments, the differential scan can perform a differential drive operation as follows. All the rows of the touch panel or a subset of rows can be driven during each step of the scan. For the driven rows, some can be driven with stimulation signals having positive phase and others with stimulation signals having negative phase. The static (non-signal related) capacitance that is approximately uniform across the touch panel may not appear in the output, because of the combination of positive and negative phases in the drive signals. After several scan steps in which different combinations of rows are driven with various stimulation signal phases and patterns, the difference between the touch data values can be calculated, thereby forming the differential touch image.

In some embodiments, the differential scan can perform a differential sense operation as follows. The rows of the touch panel can be driven one at a time, for example, with a stimulation signal. The sensing amplifiers on the columns of the touch panel can be differential sensing amplifiers, where each measures the difference between two columns, between a column and the average of all the other columns, or between one subset of columns and another subset of columns. The static (non-signal related) capacitance that is approximately uniform across the touch panel may not appear in the output, because the sensing amplifiers measure only differences. After the scan, the difference between the touch image values on each row may be calculated, thereby forming the differential touch image.

In some embodiments, the differential scan can combine the differential drive and differential sense operations to capture the differential touch image.

Figure 2:
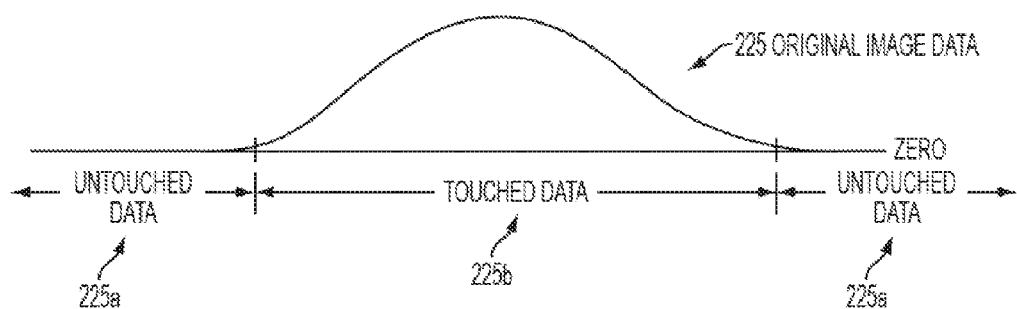
FIG. 2 illustrates an exemplary column of an original touch image and a differential touch image according to various embodiments.
Figure 2:
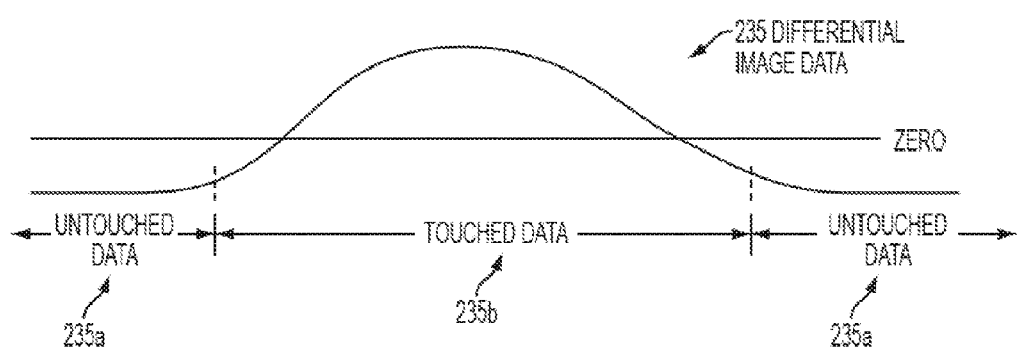

As described previously in FIG. 2, each column of image data can have an average value of zero, with untouched data being negative and touched data being negative and positive depending on the object's proximity, thereby rendering the sum of the column zero. Due to differing touch levels (as well as noise and other effects), each column of image data can have different average values. These differences can be most apparent in the untouched data, where negative values for all the columns can tend to differ. To correct these differences, the columns can be aligned relative to each other using the untouched data as a guide (320). Methods for performing the column alignment will be described in detail below.

Figure 1:
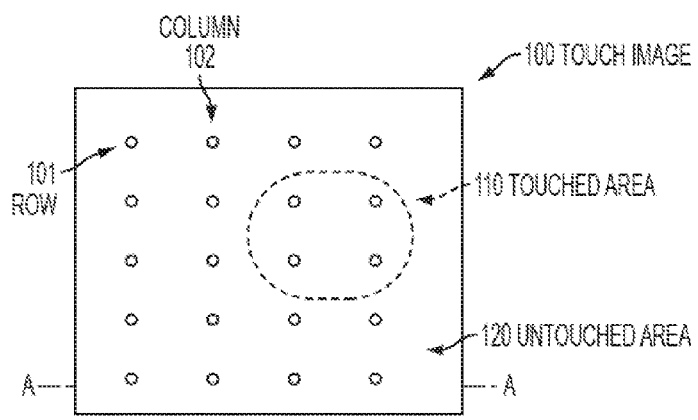
FIG. 1 illustrates an exemplary touch image according to various embodiments.
Figure 4:
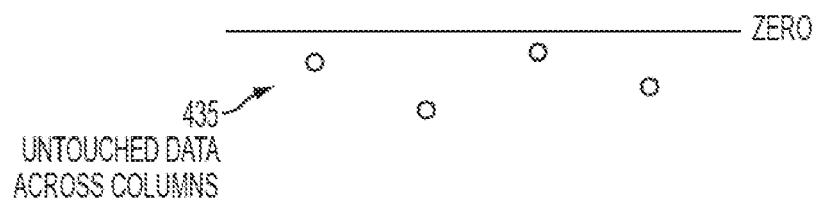
FIG. 4 illustrates an exemplary row of a differential touch image before and after column alignment according to various embodiments.
Figure 4:
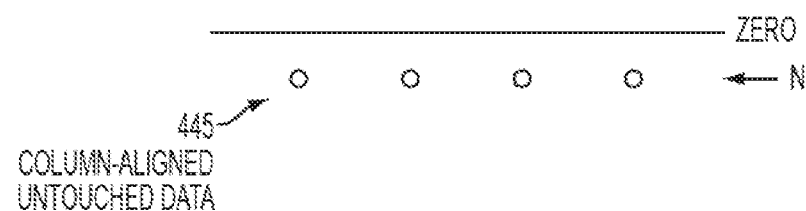

FIG. 4 illustrates an example of column alignment in the touch image of FIG. 1. In the example of FIG. 4, an exemplary row (labeled "A-A" in FIG. 1) of untouched data is shown for a differential touch image. Prior to column alignment, the row shows the erroneous differences between the untouched data values 435 (depicted by small circles) across all the columns 102 in the image. After column alignment, the row shows the untouched data values 445 across all the columns 102 having the same negative value N. The data values for the touched data in each column (not shown) can be adjusted according to the adjustments made to their corresponding untouched data.

Referring again to FIG. 3, after the columns have been aligned, the image data still lacks the DC information. This can be most apparent in the column-aligned untouched data, where the data value including the DC information should be around zero, not negative. To restore the DC information, the image can be aligned relative to a baseline value B, representative of the DC information, using the column-aligned untouched data as a guide (330). Methods for performing the baseline alignment will be described in detail below.

Figure 5:
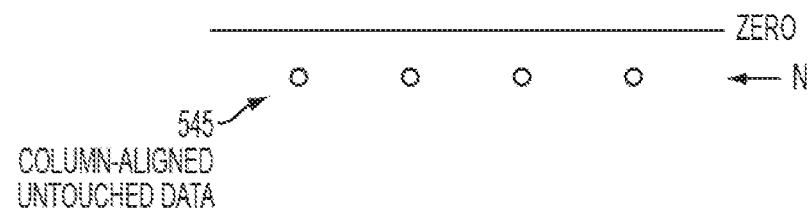
FIG. 5 illustrates an exemplary row of a differential touch image before and after baseline alignment according to various embodiments.
Figure 5:

FIG. 5 illustrates an example of baseline alignment in the column-aligned row of FIG. 4. In the example of FIG. 5, an exemplary row of column-aligned untouched data from FIG. 4 is shown. Prior to baseline alignment, the row shows untouched data 545 (depicted by small circles) with a negative data value N. After baseline alignment, the row shows the image data 555 having a data value corresponding to the baseline value. In most embodiments, the baseline value is zero. The data values for the touched data in each column (not shown) can be adjusted according to the adjustments made to their corresponding untouched data, resulting in all positive values for the touched data.

Reconstructing an original touch image from a differential touch image can be formulated in mathematical terms. Mathematically, aligning the columns of a differential touch image with each other can be formulated as selecting a set of relative column offsets which minimize the row edge energy, where each edge has a weight vector associated with it. The weights can be chosen so as to weight the untouched data heavily. This is because the required column alignments can be more apparent in the untouched data, as described previously. Mathematically, aligning the image to a baseline value can be formulated as finding an overall offset of the image which minimizes the total image energy using the edge weights. FIGS. 6 through 10 illustrate exemplary methods for performing the column and baseline alignments according to these mathematical formulations as will be described in detail below.

Figure 6:
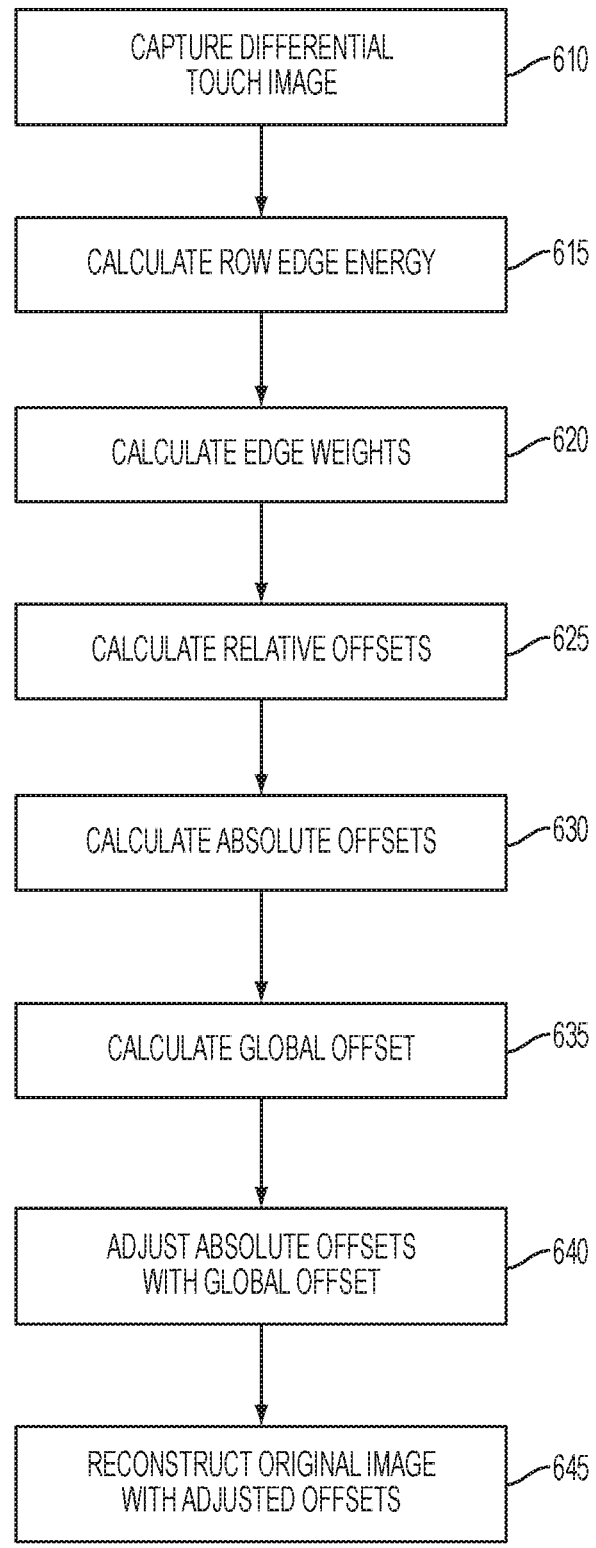
FIG. 6 illustrates an exemplary method for reconstructing an original touch image from a differential touch image based on image data according to various embodiments.

FIG. 6 illustrates an exemplary method for reconstructing an original touch image from a differential touch image using the differential image data. In the example of FIG. 6, a differential touch image can be captured during a differential scan of a touch panel (610). Consider a 3×3 differential touch image C as follows.

$$C = \begin{matrix} C_{11} & C_{12} & C_{13} \\ C_{21} & C_{22} & C_{23}, \\ C_{31} & C_{32} & C_{33} \end{matrix} \quad (1)$$

where $C_{ij}$=image data value, i=row, and j=column. For example, for 3×3 image C, $C_{23}$=the image data value for row 2 and column 3.

Row edge energy can be calculated from the image C and formed in a matrix E as follows (615).

$$E = \begin{matrix} E_{11} & E_{12} & E_{13} \\ E_{21} & E_{22} & E_{23}, \\ E_{31} & E_{32} & E_{33} \end{matrix} \quad (2)$$

where $E_{ij}$=row edge energy value defined as $(C_{ij}-C_{i,j+1})$. The first and last columns of the image C can be mathematically connected to treat the image as a cylinder for calculation purposes. For example, for 3×3 matrix E, $$E_{11}=(C_{11}-C_{12}) \quad (3)$$

$$E_{12}=(C_{12}-C_{13}) \quad (4)$$

$$E_{13}=(C_{13}-C_{11}). \quad (5)$$

Weights associated with each edge can be calculated and formed in a matrix W as follows (620).

$$W = \begin{matrix} W_{11} & W_{12} & W_{13} \\ W_{21} & W_{22} & W_{23}, \\ W_{31} & W_{32} & W_{33} \end{matrix} \quad (6)$$

where $W_{ij}$=edge weight for $E_{ij}$. For example, $W_{23}$=edge weight for $E_{23}$.

The success of the column and baseline alignment can depend to some extent on choosing the appropriate edge weights. Ideally, the weights can be chosen based on the probability of the image data making up that edge being untouched data. A variety of weight calculations can be selected from. In one embodiment, $$W_{ij}=[100-(C_{ij}-MIN_j)], \quad (7)$$

where $MIN_j$=minimum data value of image column j.

In another embodiment, $$W_{ij}=[100-abs(C_{ij}-MED_j)], \quad (8)$$

where $MED_j$=median of the negative data values of image column j. Here, only the negative data values are considered because the median of the negative values can be a more robust estimator of the current baseline value of the differential touch image. The estimated baseline value of the differential image can then be indicative of the baseline alignment to be done to reconstruct the original image.

In still another embodiment, $$W_{ij}=\max[(W_{max}-abs(C_{ij}-MED_j)), W_{min}], \quad (9)$$

where $W_{min}$, $W_{max}$=minimum and maximum edge weights, respectively. These weights can be set according to design or operational parameters of the device. For example, in some embodiments, $W_{min}$=⅕, $W_{max}$=75.

In other embodiments, mode can be used instead of median, $$W_{ij}[100-abs(C_{ij}-MOD_j)] \quad (10)$$

$$W_{ij}=\max[(W_{max}-abs(C_{ij}-MOD_j)), W_{min}], \quad (11)$$

where $MOD_j$=modal of the negative data value of image column j.

In other embodiments, a mean or a weighted mean of the negative data values of each image column j can be used rather than minimum, median, or mode to calculate weights, similar to Equations (7)-(11). Any other suitable image data parameters can be used according to various embodiments.

In other embodiments, any of the above weighting schemes can be used for an initial weighting. This initial weighting can then be modified to account for the presence of other non-touch/non-baseline effects, such as the negative pixel effect. One such weighting can including calculating the affected image data $N_{ij}$ as follows. $N_{ij}$=1, if there exists at least one image data value in image row i and image column j that is greater than zero. $N_{ij}$=0, otherwise. Accordingly, $$W_{ij,a}=W_{ij}-W_{ij}\cdot N_{ij}\cdot k, \quad (12)$$

where k=an attenuation factor. In some embodiments, k=0.5. Here, weights $W_{ij}$ for negative pixel influenced image data can be attenuated to produce attenuated weights $W_{ij,a}$.

In the above embodiments, the edge weights can be the minimum of two weights. In other embodiments, the maximum of the two weights and their arithmetic and geometric mean can be considered.

Also, in the above embodiments, the edge weights can be determined for the general case. In other embodiments, the edge weights can be determined based on variance in the untouched data of each column. To do this, the mode of each column can be calculated and the number of occurrences of the mode determined. If the mode is sufficiently strong, i.e., the number of occurrences high, a smaller maximum edge weight and the modal formulation (Equations (10), (11)) can be used. As the mode weakens, i.e., the number of occurrences decreases, the variance can increase. If the mode is sufficiently weak, i.e., the number of occurrences is low enough, a larger edge weight can be used with the median formulation (Equations (8), (9)). This can allow the weight calculation to better reflect the available data.

Relative column offsets R, i.e., the amount of column alignment to be done for each column relative to an adjacent column, can be calculated as follows (625). First, the following mean square error for $R_j$ can be minimized, $$E_{ij}W_{ij}(E_{ij}+R_j)^2, \quad (13)$$

where $R_j$=relative offset for image column j.

The relationship between the relative column offsets R and absolute column offsets A, i.e., the absolute amount of column alignment to be done for each column, as illustrated in Equation (17), can be formulated as follows.

$$R_j=A_j-A_{j-1} \quad (14)$$

where $A_j$=absolute offset for image column j. The first and last columns of the differential image C can be mathematically connected to treat the image as a cylinder for calculation purposes. For example, for 3×3 image C, $R_1=A_1-A_3$.

The partial derivatives of $R_j$ can be set to zero, $$\partial R_j = 2\Sigma_i W_{ij}(E_{ij}+R_j)=0. \tag{15}$$

$R_j$ can be found, $$R_j = \frac{\sum_i W_{ij}E_{ij}}{\sum_i W_{ij}}. \tag{16}$$

Absolute column offsets A can be calculated based on the relative offsets R as follows (630).

$$M_{ij}A_j = R_j, \tag{17}$$

$$M = \begin{matrix} 1 & -1 & 0 \\ 0 & 1 & -1 \\ -1 & 0 & 1 \end{matrix}. \tag{18}$$

Equation (18) can have multiple solutions, such that there is no true inverse of matrix M. Accordingly, a pseudo-inverse matrix P can be generated and applied as follows to get the absolute column offsets $A_j$ for each column.

$$A_j = P_{ij}R_j, \tag{19}$$

where $P_{ij}$=pseudo-inverse value of corresponding $M_{ij}$ value.

Next, a global offset $A_g$ can be calculated for the baseline alignment (635). The global offset $A_g$ can be calculated based on image data at the borders of the image, because the border data can be assumed to be untouched data, as follows.

$$A_g = \frac{\sum_{border} W_{ij}(C_{ij}+A_{ij})}{\sum_{border} W_{ij}}. \tag{20}$$

The global offset $A_g$ can also be formulated as a sum over the entire touch image, not just the border data.

The absolute column offsets $A_j$ can be adjusted based on the global offset as follows (640).

$$A_{j,f}=A_j+A_g, \tag{21}$$

where $A_{j,f}$=adjusted absolute offset for image column j.

The adjusted absolute offsets $A_{j,f}$ can be applied to the differential touch image C as follows (645).

$$I_{ij}=C_{ij}+A_{j,f}, \tag{22}$$

where $I_{ij}$=reconstructed original touch image data from differential touch image data $C_{ij}$.

Applying the offsets $A_{j,f}$ can align the columns of the image C relative to each other and the image to the baseline, thereby reconstructing an original touch image I from the differential touch image C.

Although the example refers to 3×3 matrices, it is to be understood that the method applies to any suitable matrix sizes according to various embodiments.

An inverted baseline can occur when a touching or hovering object is present at the time that a baseline value for the touch panel is established. This can be problematic in a differential touch image because the inherent DC balancing of the image data can make the inverted case look like an intended actual touch or hover and because the current baseline value is estimated based on the median of the negative touch values (as described previously). For example, a differential touch image with a single inverted touch or hover can appear as two touching or hovering objects in the reconstructed original touch image.

Figure 7A:
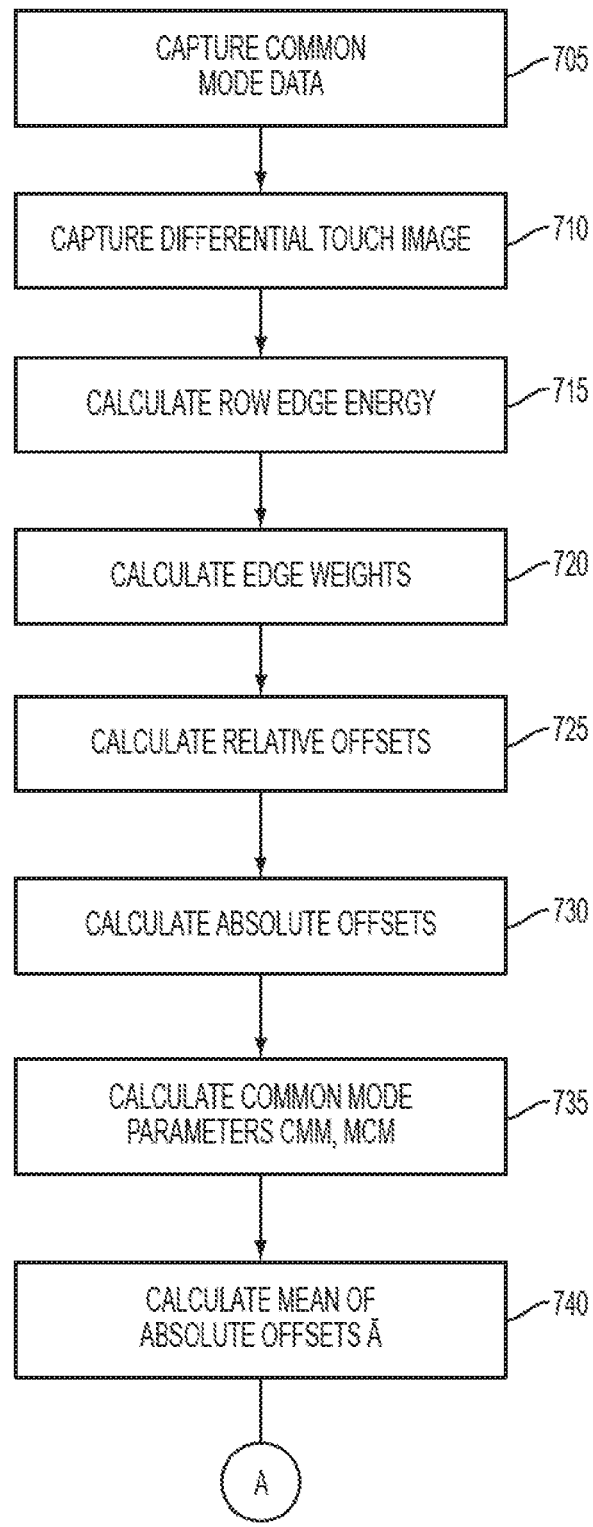
FIGS. 7A-7B illustrate an exemplary method for detecting baseline inversion in a differential touch image according to various embodiments.
Figure 7B:
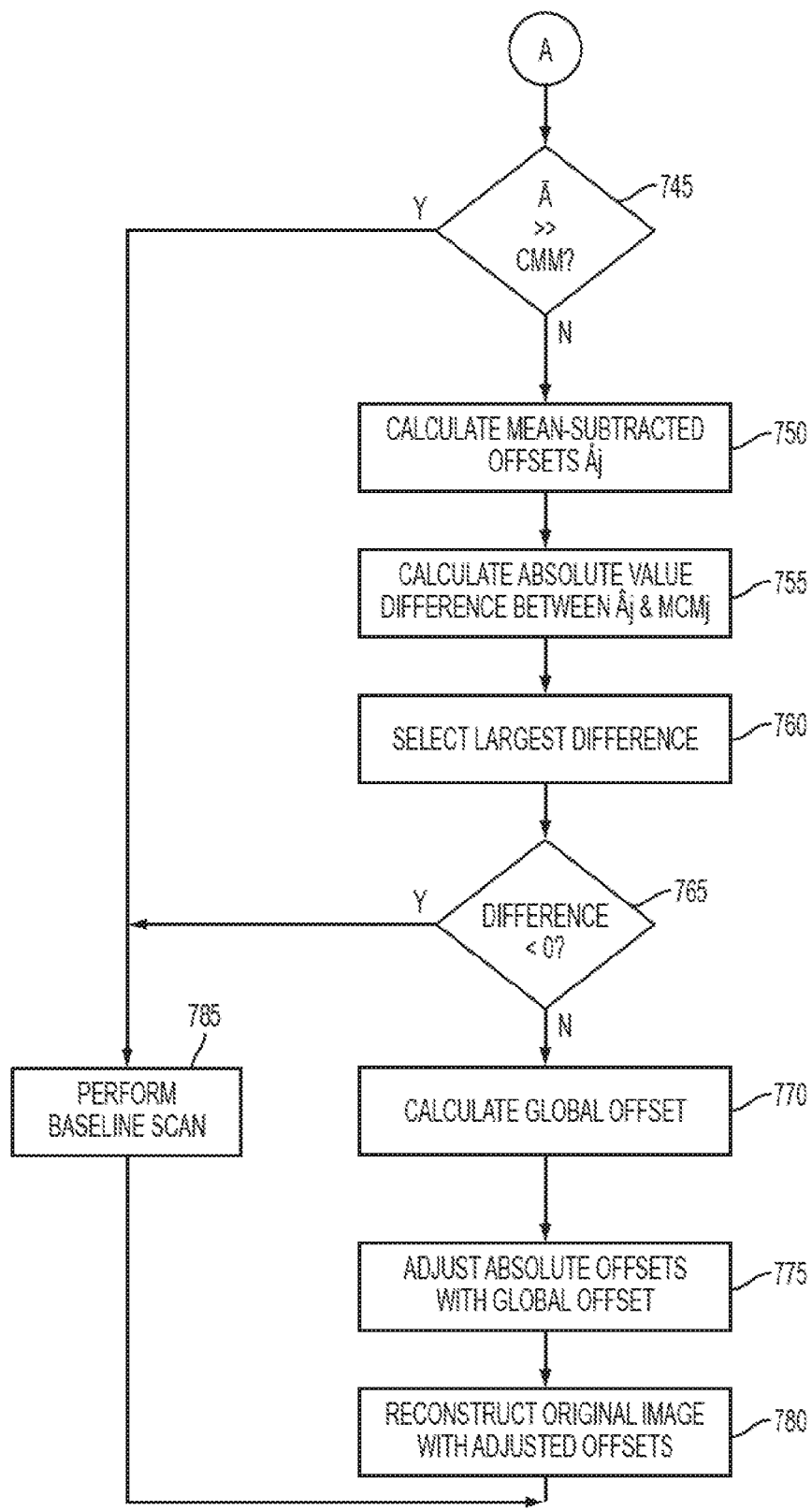

FIGS. 7A-7B illustrate an exemplary method for detecting these inversions in the method of FIG. 6. In the example of FIGS. 7A-7B, common mode data can be captured at the touch panel (705). Common mode data can refer to data output from a touch panel when the rows in the panel are driven simultaneously, for example. In other words, common mode data can be the average values for the image columns. Note that the common mode data need not be accurate, i.e., need not have low noise and/or variance. Common mode data can be captured during a separate scan period than the differential touch image scan period. In some embodiments, multiple scans can be performed to capture common mode data for each column and the captured data averaged to provide an average common mode value for each column.

The method of FIGS. 7A-7B can then proceed in a similar manner as the method of FIG. 6 (blocks 610-630) to capture a differential touch image C (710), calculate row edge energy E (715), calculate edge weights W (720), calculate relative column offsets R (725), and calculate absolute column offsets A (730).

After calculating the offsets A (730), common mode parameters can be calculated based on the captured common mode data as follows (735). The common mode mean CMM is $$CM = \frac{\sum_j CM_j}{n_{cols}}, \tag{23}$$

where $CM_j$=common mode data, and $n_{cols}$=number of columns j in the image. The mean-subtracted common mode MCM is $$MCM_j=CM_j-CMM. \tag{23}$$

The mean $\overline{A}$ of the absolute column offsets A can be calculated as follows (740). The offsets A can effectively be an estimate of the common mode data.

$$\overline{A} = \frac{\sum_j A_j}{n_{cols}}. \tag{25}$$

A first inversion detection test can be performed, in which a comparison can be made between the offset mean and the common mode mean (745). If the common mode mean CMM is substantially smaller than the offset mean $\overline{A}$, a large-scale inversion is likely present. A panel scan can be performed to capture another baseline (785) and the reconstruction can be stopped for this image. If a large-scale inversion is not detected, a second inversion detection test can be performed to look for a smaller scale inversion as described below.

First, the mean-subtracted column offsets for each column $\hat{A}_j$ can be calculated as follows (750).

$$\hat{A}_j=A_j-\overline{A}. \tag{26}$$

The second inversion detection test can compare the mean-subtracted column offsets $\hat{A}_j$ to the mean-subtracted common mode values $MCM_j$ for each column (755). The column with the largest absolute value between the two can be selected (760). For that column, if the signed difference is substantially negative, an inversion is likely present. A panel scan can be performed to capture another baseline (785) and the reconstruction can be stopped for this image. If a smaller scale inversion is not detected, the image data can be deemed inversion-free.

The method can then perform in a similar manner as FIG. 6 (blocks 635-645) for the inversion-free data to calculate a global offset $A_g$ (770), adjust the absolute column offsets A with the global offset $A_g$ (775), and apply the adjusted offset $A_{j,f}$ to the differential touch image C to reconstruct an original touch image I (780).

Figure 8A:
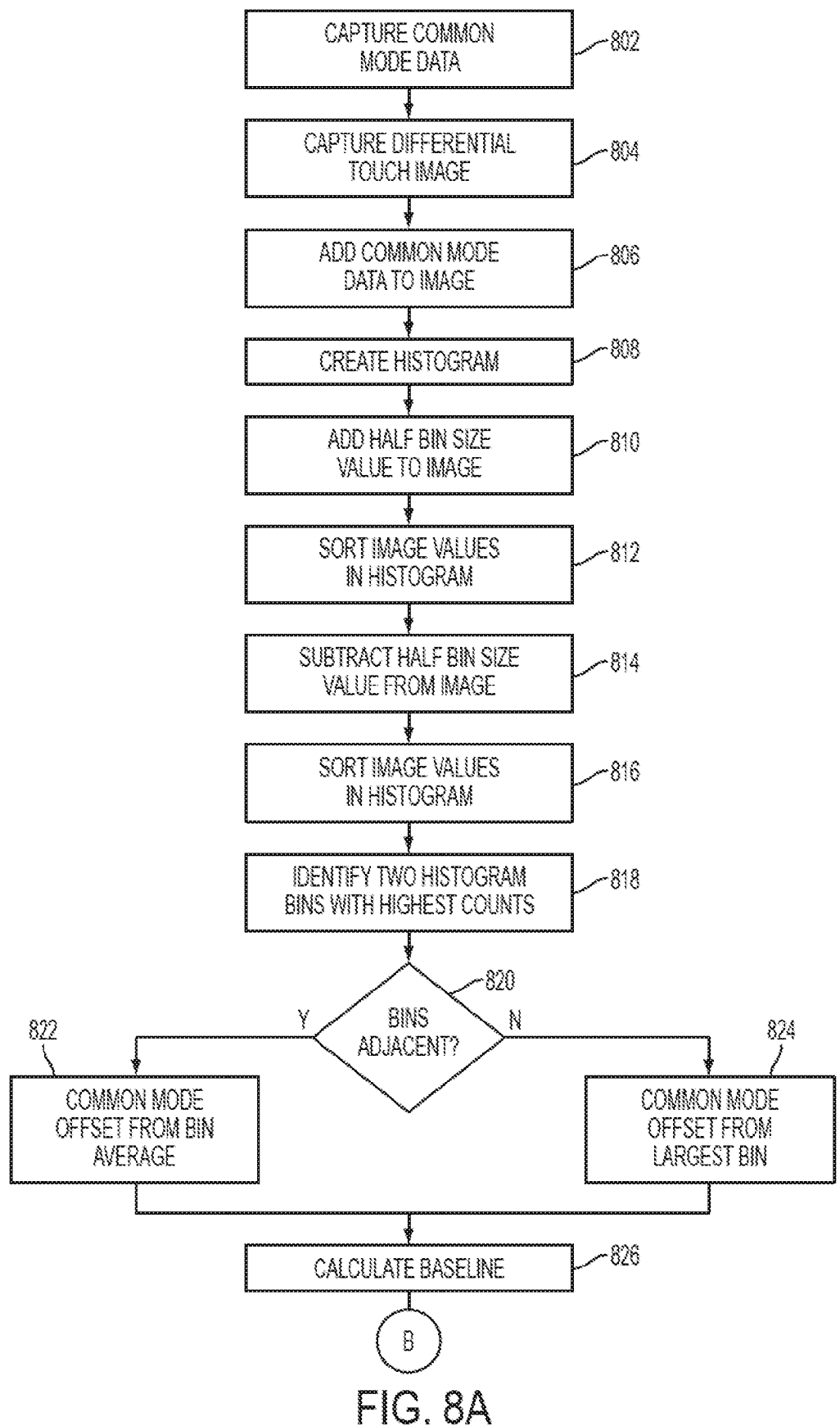
FIGS. 8A-8B illustrate an exemplary method for reconstructing an original touch image from a differential touch image based on image data and common mode data according to various embodiments.
Figure 8B:
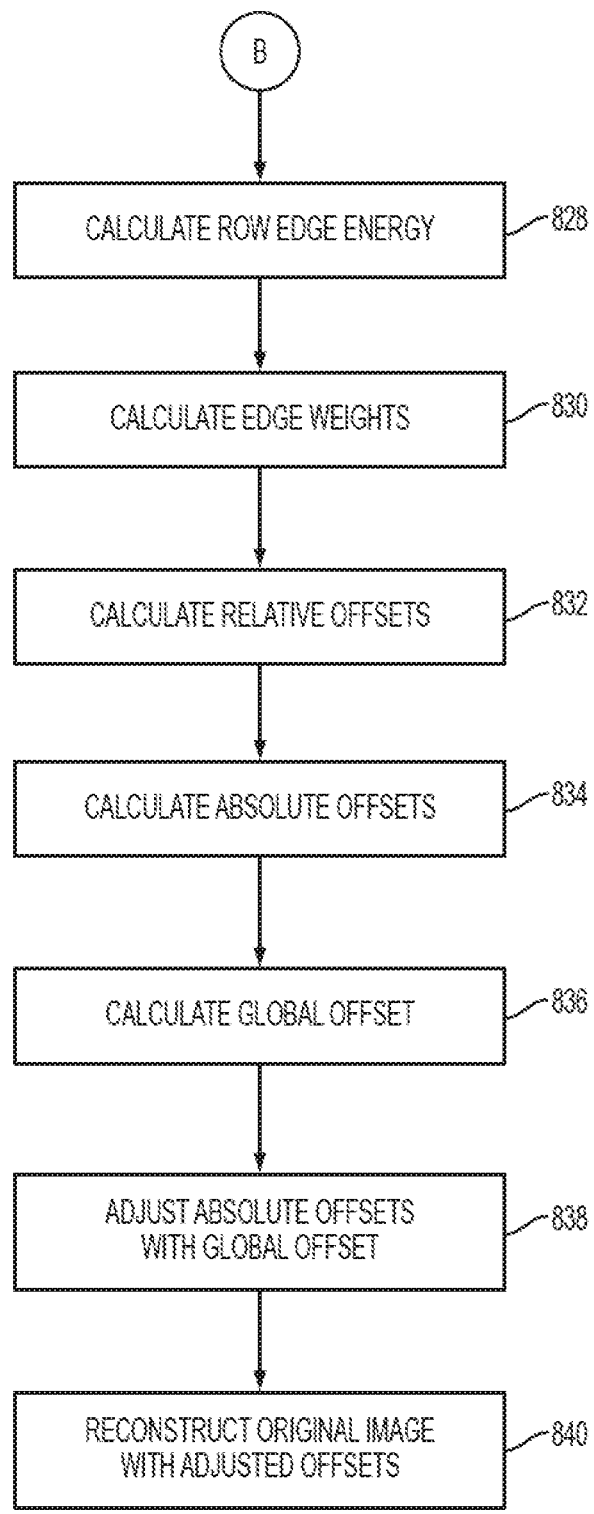

FIGS. 8A-8B illustrate an exemplary method for reconstructing an original touch image from a differential touch image using differential image data and common mode data. The method of FIGS. 8A-8B is similar to the method of FIG. 6 with the addition of the use of common mode data to estimate the baseline value of an image column (rather than using a median of the negative touch values), thereby bypassing the inversion detection method of FIGS. 7A-7B.

In the example of FIGS. 8A-8B, common mode data CM can be captured at a touch panel in a similar manner as described in FIGS. 7A-7B (802). A differential touch image C can be captured at the touch panel in a similar manner as described in FIG. 6 (804). The common mode data CM can be added to the captured image touch data C to create new image C' as follows (806).

$$C'_{ij}=C_{ij}+CM_j. \tag{27}$$

The common mode data can include substantial noise in some instances, which can lead to significant variations between successive captured images. To reduce the noise effects, a histogram approach can be used to estimate a common mode mean offset $CM_o$ as follows, under the assumption that most of the image data is untouched data, e.g., data indicative of no touching or hovering object. First, histogram bins over the range of data values in image C' can be generated for a desired bin size (808). For example, in some embodiments, the bin size can be 16. For each data value in image C' that falls into a given bin, that bin's count can be incremented by 2.

Half of the bin size can be added to the image C' to produce image $C^{(2)}$ (810). For example, in some embodiments, for a bin size of 16, a value of 8 can be added to each data value $C'_{ij}$ in the image C'. For each new data value (increased by half the bin size) in image $C^{(2)}$ that falls into a given bin of the histogram, that bin's count can be incremented by 1 (812). Half the bin size can then be subtracted from the image C' to produce image $C^{(3)}$ (814). For example, in some embodiments, for a bin size of 16, a value of 8 can be subtracted from each data value $C'_{ij}$ in the image C'. For each new data value (decreased by half the bin size) in image $C^{(3)}$ that falls into a given bin of the histogram, that bin's count can be incremented by 1 (816).

The histogram bins with the highest and second highest counts can be identified (818). If the identified bins are adjacent (820), the common mode mean offset $CM_o$ can be the weighted average of the center values for the two bins (822). If not, the common mode mean offset $CM_o$ can be the center value of the identified highest-count bin. (824). The offsets $CM_o$ can be subtracted from the common mode values $CM_j$ as follows (826).

$$BASE_j=CM_j-CM_o. \tag{28}$$

These resulting values BASEj can be estimates of the baseline values for the image columns.

Next, the method of FIGS. 8A-8B can perform in a similar manner as the method of FIG. 6 (blocks 615-645). Row edge energy can be calculated (828). Edge weights W can be calculated using $BASE_j$ as follows.

$$W_{ij}=[100-\text{abs}(C_{ij}-BASE_j)]. \tag{29}$$

Equation (29) is similar to Equation (8) with $BASE_j$ replacing $MED_j$. Relative column offsets R can be calculated (832). Absolute column offsets A can be calculated (834). A global offset $A_g$ can be calculated (836). The absolute column offsets A can be adjusted with the global offset $A_g$ (838). The adjusted offsets $A_{j,f}$ can be applied to the differential touch image C to reconstruct an original touch image I (840).

Figure 9A:
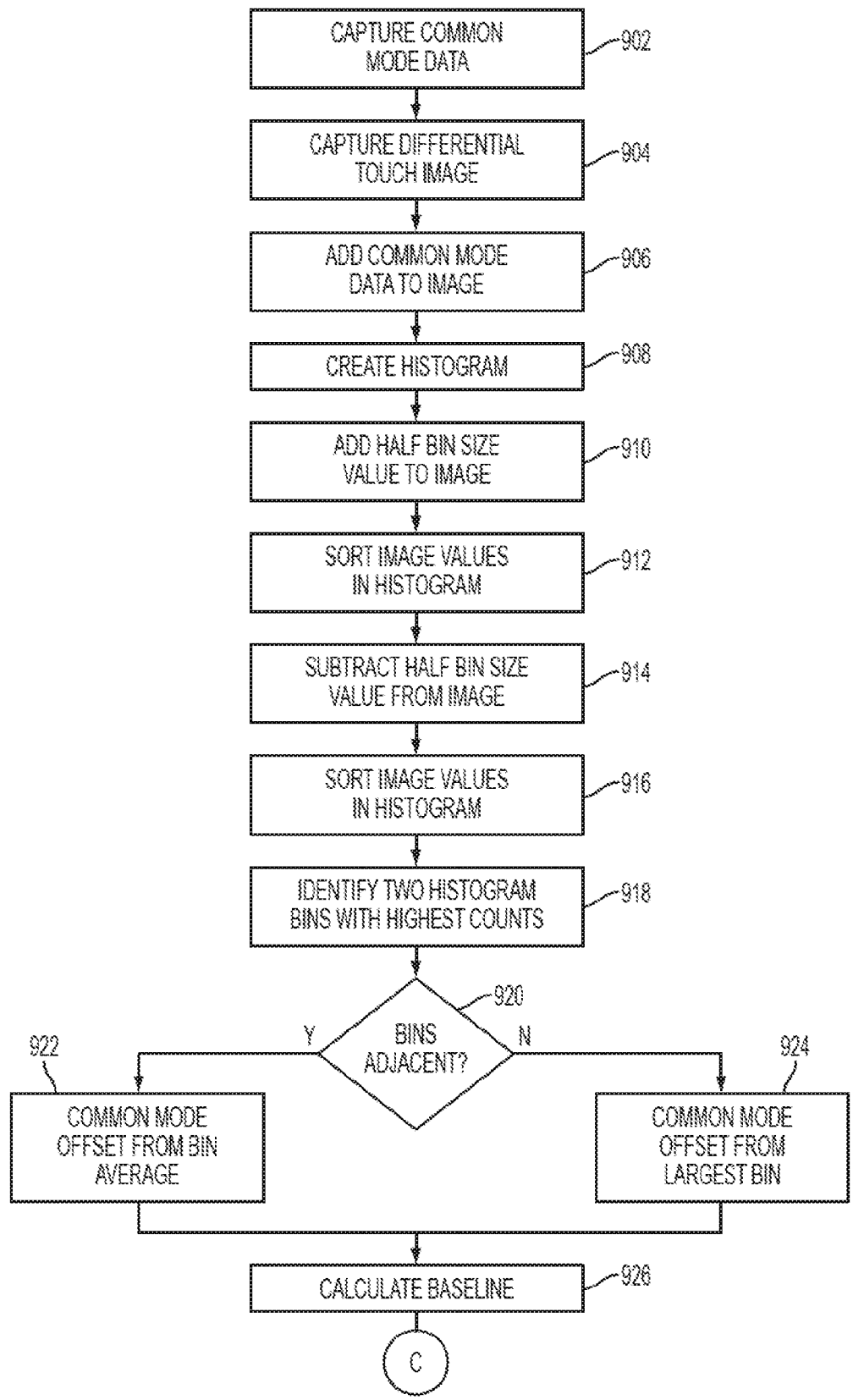
FIGS. 9A-9B illustrate another exemplary method for reconstructing an original touch image from a differential touch image based on image data and common mode data according to various embodiments.
Figure 9B:
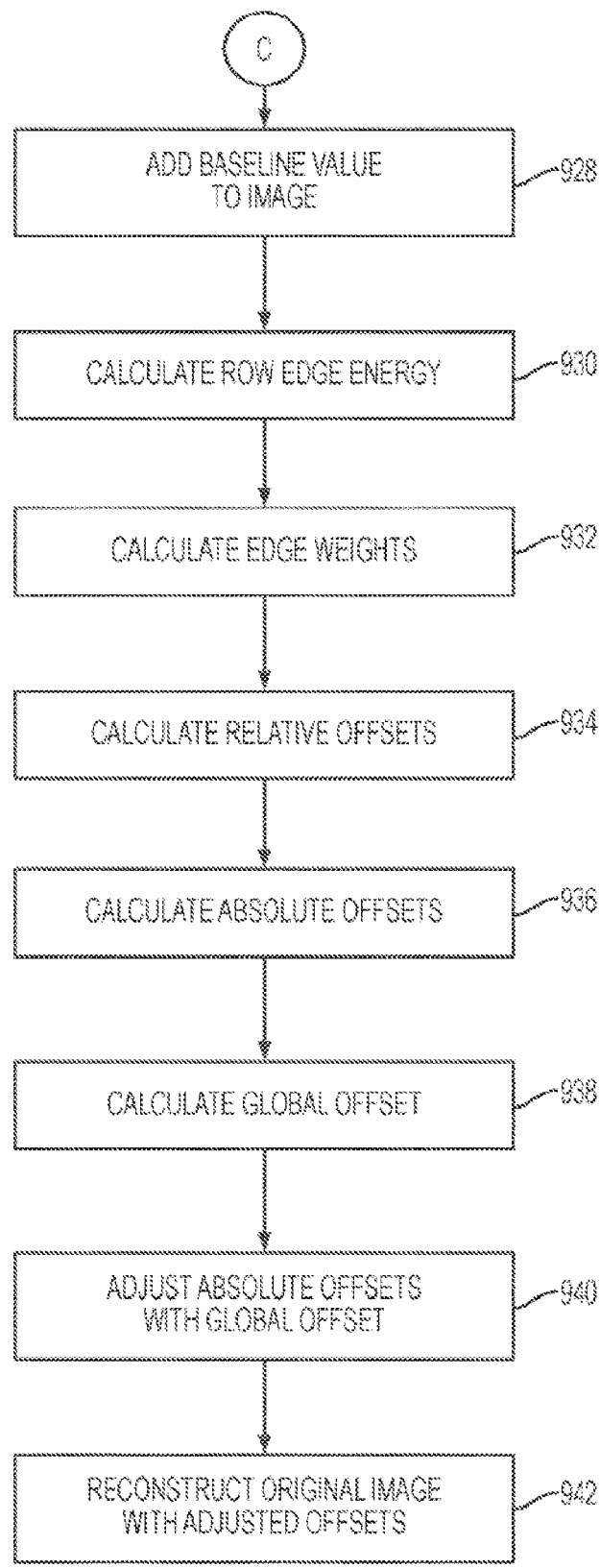

FIGS. 9A-9B illustrate another exemplary method for reconstructing an original touch image from a differential touch image using differential image data and common mode data. The method of FIGS. 9A-9B is similar to the method of FIGS. 8A-8B with the differences noted below. In the example of FIGS. 9A-9B (similar to FIGS. 8A-8B in blocks 802-826), common mode data can be captured (902), a differential touch image C captured (904), the common mode data CM added to the captured image C (906), and the histogram approach applied (908-926).

Common mode errors, such as noise and other errors, can directly couple into the reconstructed original touch image. To minimize these effects, common mode data can be limited to being used to directly reconstruct the original touch image only when there is no other source of information about the magnitudes of the differential image columns. The sum of the edge weights along a given edge, e.g., $W_{11}$, $W_{21}$, $W_{31}$, etc., formed by image columns 1 and 2, can be indicative of the amount of magnitude information available for performing column alignment. This knowledge can be integrated into the method as follows.

After using the histogram approach to calculate $BASE_j$, estimates of the baseline values for the image columns (926), $BASE_j$ can be added to the differential touch image C to form image C' as follows (928).

$$C'_{ij}=C_{ij}+BASE_j. \tag{30}$$

The row edge energy can be calculated for image C' (930) in a similar manner as the method of FIGS. 8A-8B (block 828). Edge weights W can be calculated as follows.

$$W_{ij}=\max[(W_{max}-\text{abs}(C_{ij})),W_{min}]. \tag{31}$$

If common mode data is trustworthy, a penalty term can be applied for deviating from direct reconstruction, i.e., adding the common mode data to the differential image data to directly to reconstruct the original touch image, making the mean square error for $R_j$, $$\Sigma_{ij}W_{ij}(E_{ij}+R_j)^2+\gamma R_j^2, \tag{32}$$

where γ=a penalty factor. In general, γ can be inversely proportional to common mode noise. For example, in some embodiment, γ=1.0. If a differential image column includes mostly touched data, i.e., data that indicates a touching or hovering object, the method can weigh more heavily toward direct reconstruction because of the limited amount of untouched data, i.e., data that does not indicate a touching or hovering object, in that column to perform the column and baseline alignment.

To minimize the mean square error, the partial derivatives of $R_j$ can be set to zero, $$\partial R_j=2\Sigma_i W_{ij}(E_{ij}+R_j)+2\gamma R_j=0. \tag{33}$$

$R_j$ can be found, $$R_j = \frac{\sum_i W_{ij} E_{ij}}{\sum_i W_{ij} + y}. \quad (34)$$

Next, the method of FIGS. 9A-9B can perform in a similar manner as the method of FIGS. 8A-8B (blocks 834-840) to calculate absolute column offsets A (936), calculate a global offset $A_g$ (938), adjust the absolute column offsets A with the global offset $A_g$ (940), and apply the adjusted offsets $A_{j,f}$ to the differential touch image C to reconstruct an original touch image I (942).

Figure 10:
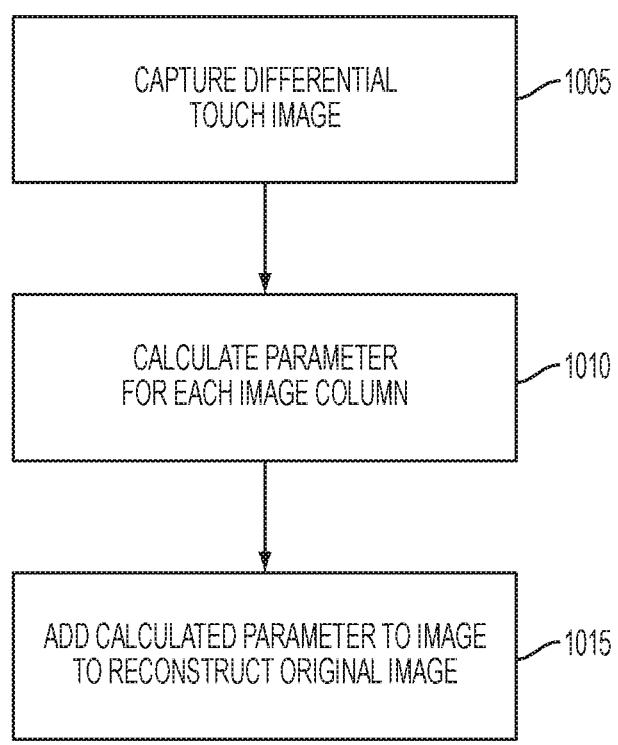
FIG. 10 illustrates another exemplary method for reconstructing an original touch image from a differential touch image based on image data according to various embodiments.

FIG. 10 illustrates another exemplary method for reconstructing an original touch image from a differential touch image using the differential image data. In the example of FIG. 10, a differential touch image C can be captured (1005). In some embodiments, a minimum data value $MIN_j$ for each image column j can be calculated (1010). The minimum data value can be added to the differential image data, thereby reconstructing the original touch image I from the differential touch image C as follows (1015).

$$I_{ij} = C_{ij} - MIN_j. \quad (35)$$

In some embodiments, a median $MED_j$ of the negative data values of image column j can be calculated rather than $MIN_j$ (1010). The median can be added to the differential image data, thereby reconstructing the original touch image I from the differential touch image C as follows (1015).

$$I_{ij} = C_{ij} - MED_j. \quad (36)$$

In some embodiments, a mode $MOD_j$ of the negative data values of image column j can be calculated rather than $MIN_j$ or $MED_j$ (1010). The mode can be added to the differential image data, thereby reconstructing the original touch image I from the differential touch image C as follows (1015).

$$I_{ij} = C_{ij} - MOD_j. \quad (37)$$

In some embodiments, a mean or a weighted mean of the negative data values of each image column j can be calculated rather than $MIN_j$, $MED_j$, or $MOD_j$ and then added to the differential image data to reconstruct the original touch image, similar to Equations (35)-(37). Any other suitable image data parameters can be used according to various embodiments.

It is to be understood that reconstruction methods are not limited to those of FIGS. 6 through 10, but can include other or additional actions capable of reconstructing an original touch image from a differential touch image according to various embodiments. It is further to be understood that the methods are not limited to differential touch images, but can be applied to any appropriate images in need of reconstruction. Although reconstruction from offsets due to DC balancing is described, it is to be understood that the methods can be used to correct for any arbitrary set of column offsets.

Figure 11:
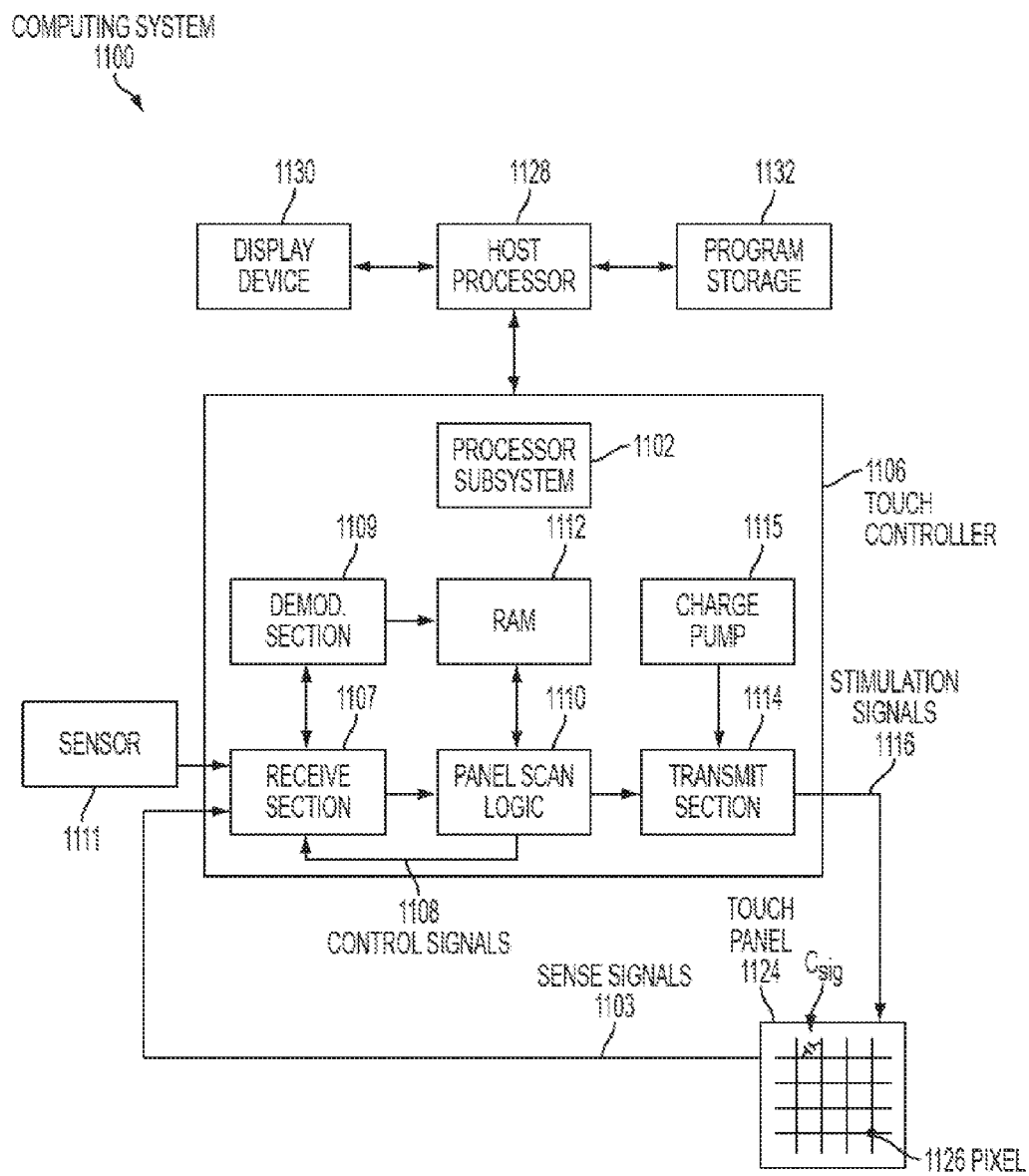
FIG. 11 illustrates an exemplary computing system that can perform original touch image reconstruction according to various embodiments.

FIG. 11 illustrates an exemplary computing system 1100 that can reconstruct an original touch image from a differential touch image according to various embodiments. In the example of FIG. 11, computing system 1100 can include touch controller 1106. The touch controller 1106 can be a single application specific integrated circuit (ASIC) that can include one or more processor subsystems 1102, which can include one or more main processors, such as ARM968 processors or other processors with similar functionality and capabilities. However, in other embodiments, the processor functionality can be implemented instead by dedicated logic, such as a state machine. The processor subsystems 1102 can also include peripherals (not shown) such as random access memory (RAM) or other types of memory or storage, watchdog timers and the like. The touch controller 1106 can also include receive section 1107 for receiving signals, such as touch signals 1103 of one or more sense channels (not shown), other signals from other sensors such as sensor 1111, etc. The touch controller 1106 can also include demodulation section 1109 such as a multistage vector demodulation engine, panel scan logic 1110, and transmit section 1114 for transmitting stimulation signals 1116 to touch sensor panel 1124 to drive the panel. The panel scan logic 1110 can access RAM 1112, autonomously read data from the sense channels, and provide control for the sense channels. In addition, the panel scan logic 1110 can control the transmit section 1114 to generate the stimulation signals 1116 at various frequencies and phases that can be selectively applied to rows of the touch sensor panel 1124.

The touch controller 1106 can also include charge pump 1115, which can be used to generate the supply voltage for the transmit section 1114. The stimulation signals 1116 can have amplitudes higher than the maximum voltage by cascading two charge store devices, e.g., capacitors, together to form the charge pump 1115. Therefore, the stimulus voltage can be higher (e.g., 6V) than the voltage level a single capacitor can handle (e.g., 3.6 V). Although FIG. 11 shows the charge pump 1115 separate from the transmit section 1114, the charge pump can be part of the transmit section.

Touch sensor panel 1124 can include a capacitive sensing medium having drive lines and multiple strips of sense lines according to various embodiments. The drive and sense line strips can be formed from a transparent conductive medium such as Indium Tin Oxide (ITO) or Antimony Tin Oxide (ATO), although other transparent and non-transparent materials such as copper can also be used. The drive lines and sense line strips can be formed on a single side of a substantially transparent substrate separated by a substantially transparent dielectric material, on opposite sides of the substrate, on two separate substrates separated by the dielectric material, etc.

Computing system 1100 can also include host processor 1128 for receiving outputs from the processor subsystems 1102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 1128 can also perform additional functions that may not be related to panel processing, and can be coupled to program storage 1132 and display device 1130 such as an LCD display for providing a UI to a user of the device. In some embodiments, the host processor 1128 can be a separate component from the touch controller 1106, as shown. In other embodiments, the host processor 1128 can be included as part of the touch controller 1106. In still other embodiments, the functions of the host processor 1128 can be performed by the processor subsystem 1102 and/or distributed among other components of the touch controller 1106. The display device 1130 together with the touch sensor panel 1124, when located partially or entirely under the touch sensor panel or when integrated with the touch sensor panel, can form a touch sensitive device such as a touch screen.

Note that one or more of the functions described above can be performed, for example, by firmware stored in memory (e.g., one of the peripherals) and executed by the processor subsystem 1102, or stored in the program storage 1132 and executed by the host processor 1128. The firmware can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any non-transitory medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any non-transitory medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the touch panel is not limited to touch, as described in FIG. 11, but can be a proximity panel or any other panel according to various embodiments. In addition, the touch sensor panel described herein can be either a single-touch or a multi-touch sensor panel.

It is further to be understood that the computing system is not limited to the components and configuration of FIG. 11, but can include other and/or additional components in various configurations capable of compensating for a negative pixel effect according to various embodiments.

Figure 12:
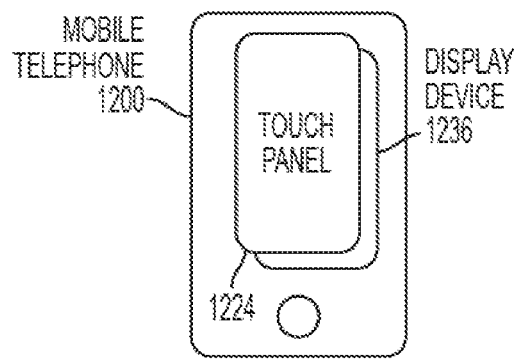
FIG. 12 illustrates an exemplary mobile telephone that can perform original touch image reconstruction according to various embodiments.

FIG. 12 illustrates an exemplary mobile telephone 1200 that can include touch sensor panel 1224, display 1236, and other computing system blocks, capable of reconstructing an original touch image from a differential touch image according to various embodiments.

Figure 13:
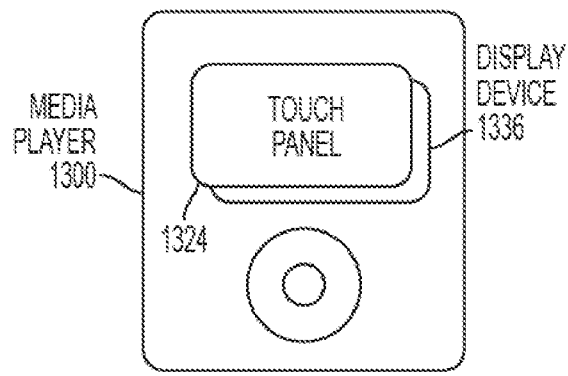
FIG. 13 illustrates an exemplary digital media player that can perform original touch image reconstruction according to various embodiments.

FIG. 13 illustrates an exemplary digital media player 1300 that can include touch sensor panel 1324, display 1336, and other computing system blocks, capable of reconstructing an original touch image from a differential touch image according to various embodiments.

Figure 14:
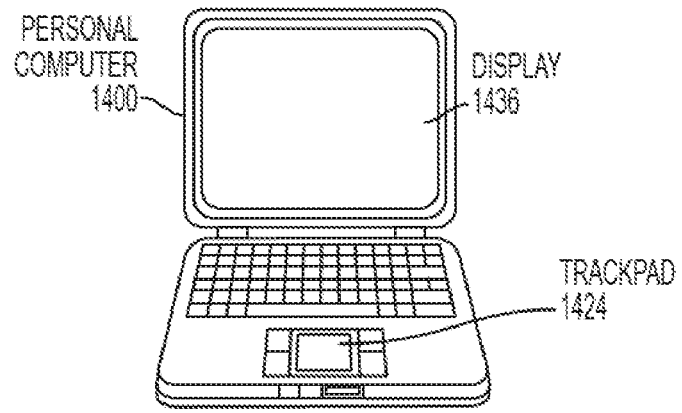
FIG. 14 illustrates an exemplary portable computer that can perform original touch image reconstruction according to various embodiments.

FIG. 14 illustrates an exemplary personal computer 1400 that can include touch sensor panel (trackpad) 1424, display 1436, and other computing system blocks, capable of reconstructing an original touch image from a differential touch image according to various embodiments.

The mobile telephone, media player, and personal computer of FIGS. 12 through 14 can realize improved accuracy with capability to reconstruct an original touch image from a differential touch image according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method for reconstructing an original touch image from a differential touch image, comprising:
    capturing the differential touch image at a touch sensitive device;
    capturing common mode data at the device;
    combining the captured differential touch image data and the common mode data;
    performing a column alignment to align columns of the differential touch image to each other based on the combined data; and
    performing a baseline alignment to align the column-aligned differential touch image with a baseline value.

2. The method of claim 1, further comprising:
    sorting data values based on the combined data into bins of a histogram;
    identifying a highest-count bin of the histogram; and
    determining an offset value based on the highest-count bin.

3. The method of claim 2, wherein the baseline value is based on the determined offset value.

4. The method of claim 2, wherein values used to align columns of the differential touch image to each other are based on the determined offset value.

5. The method of claim 2, further comprising:
    identifying a second highest-count bin of the histogram;
    in accordance with a determination that the first and second highest-count bins are adjacent, the determined offset value is a weighted average of the center values for the two identified bins; and
    in accordance with a determination that the two identified bins are not adjacent, the determined offset value is the center value of the highest-count bin.

6. The method of claim 1, wherein combining the captured differential touch image data and the common mode data comprises scaling the differential touch image data and the common mode data based on a number of data values in the differential image indicative of a touching or hovering object.

7. The method of claim 6, wherein the scaling reduces contribution of the common mode data to the combined data as a number of data values indicating the touching or hovering object in differential touch image data increases.

8. The method of claim 1, wherein the baseline value is based on the combined data.

9. A touch sensitive device comprising:
    a touch panel capable of sensing a proximate object;

scan logic couplable to the touch panel and capable of performing a scan of the touch panel so as to capture a first touch image; and a processor capable of reconstructing a second touch image from the first touch image, the reconstructing including:

capturing the differential touch image at a touch sensitive device;

capturing common mode data at the device;

combining the captured differential touch image data and the common mode data;

performing a column alignment to align columns of the differential touch image to each other based on the combined data; and performing a baseline alignment to align the column-aligned differential touch image with a baseline value.

10. The touch sensitive device of claim 9, wherein the reconstructing further comprises:

sorting data values based on the combined data into bins of a histogram;

identifying a highest-count bin of the histogram; and determining an offset value based on the highest-count bin.

11. The touch sensitive device of claim 10, wherein the baseline value is based on the determined offset value.

12. The touch sensitive device of claim 10, wherein values used to align columns of the differential touch image to each other are based on the determined offset value.

13. The touch sensitive device of claim 10, the reconstruction further comprising:

identifying a second highest-count bin of the histogram;

in accordance with a determination that the first and second highest-count bins are adjacent, the determined offset value is a weighted average of the center values for the two identified bins; and in accordance with a determination that the two identified bins are not adjacent, the determined offset value is the center value of the highest-count bin.

14. The touch sensitive device of claim 9, wherein combining the captured differential touch image data and the common mode data comprises scaling the differential touch image data and the common mode data based on a number of data values in the differential image indicative of a touching or hovering object.

15. The touch sensitive device of claim 14, wherein the scaling reduces contribution of the common mode data to the combined data as an amount of data indicating a touching or hovering object in differential touch image data increases.

16. The touch sensitive device of claim 9, wherein the baseline value is based on the combined data.

17. A method for reconstructing an original touch image from a differential touch image, comprising:

capturing the differential touch image at a touch sensitive device;

capturing common mode data at the device;

performing a column alignment to align columns of the differential touch image to each other based on the captured common mode data; and performing a baseline alignment to align the column-aligned differential touch image with a baseline value.

18. The method of claim 17, further comprising:

sorting data values based on the combined data into bins of a histogram;

identifying a highest-count bin of the histogram; and determining an offset value based on the highest-count bin.

19. The method of claim 18, further comprising:

identifying a second highest-count bin of the histogram;

in accordance with a determination that the first and second highest-count bins are adjacent, the determined offset value is a weighted average of the center values for the two identified bins; and in accordance with a determination that the two identified bins are not adjacent, the determined offset value is the center value of the highest-count bin.

20. The method of claim 17, wherein combining the captured differential touch image data and the common mode data comprises scaling the differential touch image data and the common mode data based on a number of data values in the differential image indicative of a touching or hovering object.

* * * * *